US006542792B2

(12) United States Patent
Schubert et al.

(10) Patent No.: US 6,542,792 B2
(45) Date of Patent: *Apr. 1, 2003

(54) VEHICLE ROLLOVER DETECTION APPARATUS AND METHOD

(75) Inventors: Peter James Schubert, Kokomo, IN (US); Edward J Wallner, Kokomo, IN (US); David William Braun, Kokomo, IN (US); David John Nichols, Carmel, IN (US); Jan Konried Schiffmann, Newbury Park, CA (US); Dale Horan, Indianapolis, IN (US)

(73) Assignee: Delphi Technologies, Inc., Troy, MI (US)

(*) Notice: Subject to any disclaimer, the term of this patent is extended or adjusted under 35 U.S.C. 154(b) by 182 days.

This patent is subject to a terminal disclaimer.

(21) Appl. No.: 09/725,645

(22) Filed: Nov. 29, 2000

(65) Prior Publication Data

US 2002/0065591 A1 May 30, 2002

(51) Int. Cl.⁷ .................................................. G06F 7/00
(52) U.S. Cl. ........................ 701/1; 180/272; 280/735; 340/440
(58) Field of Search ................ 701/1, 36, 37, 701/38, 39, 45, 46, 49; 180/271, 281, 282; 280/734, 735, 756, 801.1; 340/440

(56) References Cited

U.S. PATENT DOCUMENTS

| 5,610,575 | A | | 3/1997 | Gioutsos | 340/429 |
|---|---|---|---|---|---|
| 5,825,284 | A | | 10/1998 | Dunwoody et al. | 340/440 |
| 5,835,873 | A | | 11/1998 | Darby et al. | |
| 5,890,084 | A | | 3/1999 | Halasz et al. | 701/45 |
| 6,002,974 | A | | 12/1999 | Schiffmann | 701/36 |
| 6,002,975 | A | | 12/1999 | Schiffmann et al. | 701/36 |
| 6,038,495 | A | | 3/2000 | Schiffmann | 701/1 |
| 6,192,305 | B1 | * | 2/2001 | Schiffmann | 701/45 |

FOREIGN PATENT DOCUMENTS

| DE | 19606043 | 2/1996 |
|---|---|---|
| DE | 19609176 | 3/1996 |
| DE | 19609717 | 3/1996 |
| EP | 306003 | 8/1988 |

OTHER PUBLICATIONS

Mike Horton, Charles Kitchin, "A Dual–Axis Tilt Sensor Based on Micromachined Accelerometers," Sensors, Apr. 1996, pp. 91–94.
Steiner, Weidel, Kublbeck, Steurer, Hora, "Roll Over Detection" SAE Technical Paper Series, Feb. 24–27, 1997, pp. 45–49.
P.E.M. Frere, "Problems of Using Accelerometers to Measure Angular Rate in Automobiles" Sensors and Actuators A. 25–27, 1991, pp. 821–824.
Neff, Natalie, Ward's Auto World, Nov. 1996, p. 74.
Massachusetts Inst. Of Tech., Kalman Filter Estimation of Underwater Vehicle Position and Attitude, Sept. 1994, p. 106.

* cited by examiner

*Primary Examiner*—Gertrude Arthur
(74) *Attorney, Agent, or Firm*—Robert M. Sigler (57) ABSTRACT

A vehicle rollover sensing apparatus and method are provided for detecting an overturn condition of the vehicle. The rollover sensing apparatus includes an angular rate sensor for sensing attitude rate of change of a vehicle and producing an output signal indicative thereof. The rollover sensing apparatus also has an integrator for integrating the sensed attitude rate of change signal over a variable time window and producing an attitude angle. The rollover sensing apparatus further includes deployment logic for comparing the attitude angle and attitude rate of change to a pair of variable threshold values, with a gray-zone that varies based on time, and an output for deploying a vehicle overturn condition signal based on the comparison. Adaptive bias removal and output minimum logic reduces bias and noise associated with the sensed signal.

52 Claims, 8 Drawing Sheets

VEHICLE ROLLOVER DETECTION APPARATUS AND METHOD

TECHNICAL FIELD

The present invention generally relates to rollover sensors and, more particularly, to vehicle rollover detection with reduced sensor hardware for sensing a rollover condition of a vehicle.

BACKGROUND OF THE INVENTION

Increasingly, automotive vehicles are employing safety-related devices that deploy in the event that the vehicle experiences a rollover so as to provide added protection to the occupants of the vehicle. For example, upon detecting a vehicle rollover condition, a pop-up roll bar can be deployed such that, when activated, the roll bar further extends vertically outward to increase the height of support provided by the roll bar during a rollover event. Other controllable features may include deployment of one or more airbags, such as frontal airbags, side mounted airbags, and roof rail airbags, or actuating a pretensioner to pretension a restraining device, such as a seatbelt or safety harness, to prevent occupants of the vehicle from ejecting from the vehicle or colliding with the roof of the vehicle during a rollover event.

In the past, mechanical-based rollover sensors have been employed in automotive vehicles to measure the angular position of the vehicle from which a rollover condition can be determined. The mechanical sensors have included the use of a pendulum normally suspended vertically downward due to the Earth's gravitational force. Many mechanical automotive sensing devices are employed simply to monitor the angular position of the vehicle relative to a horizontal level ground position. As a consequence, such mechanical automotive sensors have generally been susceptible to error when the vehicle travels around a corner or becomes airborne, in which case the Earth's gravitational force, which the sensor relies upon, may be overcome by other forces.

More sophisticated rollover sensing approaches require the use of as many as six sensors including three accelerometers and three angular rate sensors, also referred to as gyros, and a microprocessor for processing the sensed signals. The three accelerometers generally provide lateral, longitudinal, and vertical acceleration measurements of the vehicle, while the three gyros measure angular pitch rate, roll rate, and yaw rate. However, such sophisticated rollover sensing approaches generally require a large number of sensors which add to the cost and complexity of the overall system. In addition, known sophisticated systems are generally susceptible to cumulative drift errors, and therefore occasionally must be reset.

In an attempt to minimize the number of sensors required, conventional sensing approaches have employed, at a minimum, both an angular rate sensor and an accelerometer. For those sensors designed to detect both rollover and pitchover events, a second angular rate sensor and a second accelerometer are typically added. While the angular rate sensor can be integrated to calculate a roll angle, in practice, angular rate sensors typically generate a non-zero, time-varying output, even in the absence of a roll rate. This bias may cause a significant error in the integration-generated roll angle, and such bias must be compensated in order to provide an accurate sensed measurement. Accordingly, conventional rollover sensing approaches typically require auxiliary sensors, in lieu of the single angular rate sensor, to compensate for zero-input biases inherent in many angular rate sensors.

Accordingly, it is desirable to provide for an accurate and timely rollover detection apparatus and method that minimizes the number of sensors that are required to detect rollover and/or pitchover of the vehicle. More particularly, it is desirable to provide for a rollover detection apparatus and method that allows for use of an angular rate sensor, without requiring auxiliary sensors in addition thereto. It is further desirable to provide for the removal of signal bias and noise associated with sensed signals generated by a sensor, such as an angular rate sensor.

SUMMARY OF THE INVENTION

In accordance with the teachings of the present invention, a vehicle rollover sensing apparatus and method are provided for detecting an anticipated overturn condition of the vehicle and providing timely deployment of safety-related devices. The rollover sensing apparatus includes an angular rate sensor for sensing attitude rate of change of a vehicle and producing an output signal indicative thereof. The rollover sensing apparatus also has an integrator for integrating the sensed attitude rate of change signal and producing an attitude angle. According to one aspect of the present invention, the integrator has a variable time window. The rollover sensing apparatus further includes a comparator for comparing the attitude angle and attitude rate of change to threshold values, and an output for deploying a vehicle overturn condition signal based on the comparison. According to another aspect of the present invention, the comparator includes a gray-zone deployment indicator.

A method is also provided for detecting an anticipated overturn condition of a vehicle. The method includes the steps of sensing the attitude rate of change of a vehicle and producing an output signal indicative thereof, integrating the sensed attitude rate of change signal during a time window to generate an attitude angle, comparing the attitude angle and attitude rate of change to threshold values, and deploying an output signal based on the comparison. According to one aspect of the present invention, the time window is variable. According to a further aspect of the present invention, the comparison is compared to a gray-zone indicator.

According to a further aspect of the present invention, a bias removal device is provided for removing bias from a sensed signal, such as a sensed rate signal. The bias removal device includes an input for receiving a sensed signal from a sensor, a high pass filter for filtering the sensed signal when the sensed signal has an amplitude below a first threshold, an all pass region for passing the sensed signal when the sensed signal has an amplitude above the first threshold, and an output for providing a bias removed output signal.

Accordingly, the rollover sensing apparatus and method of the present invention advantageously minimizes the number of sensors that are required to detect an overturn (rollover and/or pitchover) condition of a vehicle. It should be appreciated that the apparatus and method employ an angular rate sensor, without requiring other auxiliary sensors, to achieve cost efficient and accurate rollover detection. It should further be appreciated that the adaptive bias removal allows for enhanced accuracy with an angular rate sensor, without requiring use of auxiliary sensors.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
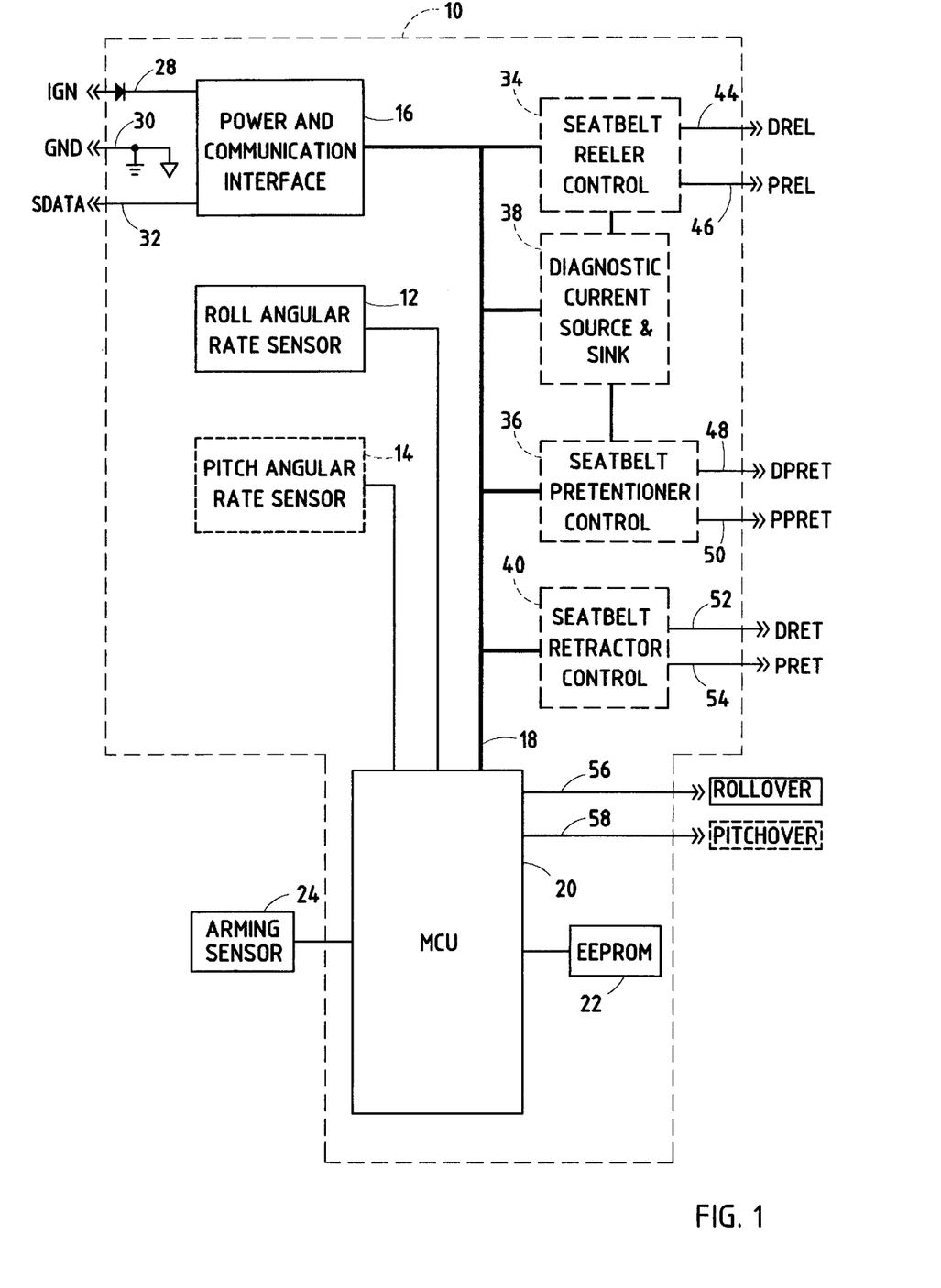
FIG. 1 is a block diagram of a rollover sensing module for detecting vehicle rollover (and pitchover) according to the present invention.

Referring to FIG. 1, a rollover sensing module 10 is illustrated for use in sensing roll angular rate and/or pitch angular rate of a vehicle and detecting a rollover and/or pitchover condition of an automotive vehicle (not shown). The rollover sensing module 10 of the present invention is preferably mounted on an automotive vehicle and is used to detect, in advance, a future rollover event (condition) of the vehicle. A vehicle rollover condition, as described herein in connection with the present invention, may include side-to-side rotation of the vehicle about the longitudinal axis of the vehicle, commonly referred to as a "vehicle rollover," or back-to-front rotation about the lateral axis of the vehicle, commonly referred to as a "vehicle pitchover," or a combination of rollover and pitchover. For purposes of describing the rollover sensing of the present invention, the term "rollover" is generally used to refer to either a rollover condition or a pitchover condition.

The rollover sensing module 10 is designed to be located in an automotive vehicle to sense vehicle dynamics and to detect a rollover condition of the vehicle. Upon detecting a vehicle rollover condition, the rollover sensing module 10 provides a rollover deployment output signal indicative of the detected rollover condition. The rollover deployment output signal may be supplied to one or more selected vehicle devices, such as safety-related devices, to deploy the device(s) in anticipation of an upcoming rollover event. The detected rollover condition output signal may be employed to deploy a pop-up roll bar to provide vertical clearance to the occupants of the vehicle as the vehicle rolls over. Similarly, the detected rollover deployment output signal may actuate an occupant restraining device, such as a seatbelt or harness safety pretensioner, to eliminate slack in the restraining device just prior to the vehicle rollover event occurring. Other control functions include deployment of front, side or roof-rail (side curtain) deployment airbags to protect the vehicle occupants during a vehicle rollover. These and other devices may be controlled in response to the rollover deployment output signal.

The rollover sensing module 10 preferably includes one sensor for detecting a rollover, and two sensors for detecting both rollover and pitchover, with both sensors preferably assembled together on module 10, and each sensor oriented to perform the intended sensing operation. The sensors include a roll angular rate sensor 12 for use in detecting vehicle rollover, and a pitch angular rate sensor 14 for use in detecting vehicle pitchover. The roll angular rate sensor 12 measures the time rate of angular roll about the longitudinal axis of the vehicle, while the pitch rate sensor 14 measures the time rate of angular pitch about the lateral axis of the vehicle. It should be appreciated that the present invention advantageously requires only one of the roll and pitch angular rate sensors 12 and 14 to determine a rollover or pitchover event of the vehicle, and both sensors 12 and 14 to determine both rollover and pitchover of the vehicle, without requiring auxiliary sensors as is generally required in conventional rollover sensing systems.

The rollover sensing module 10 further includes a microprocessor control unit (MCU) 20 for processing sensed vehicle parameters according to a rollover sensing algorithm to detect vehicle rollover and pitchover conditions. MCU 20 is preferably a microprocessor-based controller and, according to one example, may include Model No. 68HC, made available by Motorola. Associated with MCU 20 is an electrically erasable programmable read-only memory (EEPROM) 22 that stores various programmed calibrations for performing the rollover detection algorithm, as is explained herein. The EEPROM 22 can be integrated with the MCU 20 or provided external thereto.

Rollover sensing module 10 also includes a power and communication interface 16 for receiving an ignition (IGN) signal on line 28 and communicating via serial data (SDATA) on serial data bus 32. Rollover sensing module 10 is further grounded via ground (GND) line 30. Power and communication interface 16 converts an approximately 12-volt DC IGN signal input to 5-volts DC for use as a power supply to the powered components on module 10. Serial data communicated on serial data bus 32 may include individual sensor outputs and processor outputs, as well as programmed inputs.

MCU 20 receives, as inputs, signals from each of angular rate sensors 12 and 14. In addition, the MCU 22 may receive other various inputs which, although not required, may be employed in connection with the rollover detection and deployment of the present invention. These inputs may include a signal from a rollover arming sensor 24 that serves as a redundancy check prior to deploying devices during a rollover event, as is known in the art. Examples of other inputs may include a passenger presence signal, which may be generated as a sensed output from an occupant presence sensor for purposes of sensing the presence of a passenger, and a driver's seatbelt (DSB) signal and a passenger's seatbelt (PSB) signal which indicate the use of driver and passenger(s) seatbelts, respectively.

MCU 20 processes the various input signals, as will be explained hereinafter, and produces one of, or both, deployment output signals identified as ROLLOVER signal 56 and PITCHOVER signal 58, which are indicative of a detected vehicle rollover condition and a pitchover condition, respectively. In addition, MCU 20 provides the detected rollover and pitchover output signals on line 18 to control designated onboard control devices, such as a seatbelt reeler control 34, a seatbelt pretensioner control 36, and a seatbelt retractor control 40. Seatbelt reeler control 34 controls the seatbelt reeler for both the driver's side and passenger's side via respective signals DREL and PREL, as provided on output signals 44 and 46, respectively. Seatbelt pretensioner control 36 likewise controls seatbelt pretensioning for the driver's side and passenger's side via signals DPRET and PPRET, as provided on output lines 48 and 50, respectively. A diagnostic current source and sink 38 allows for diagnostic testing of the seatbelt reeler control 34 and seatbelt pretensioner control 36. The seatbelt retractor control 40 controls retractor locks associated with the seatbelt to both the driver's seatbelt and passenger's seatbelt via signals DRET and PRET, as provided on output lines 52 and 54.

Figures 2, 3:
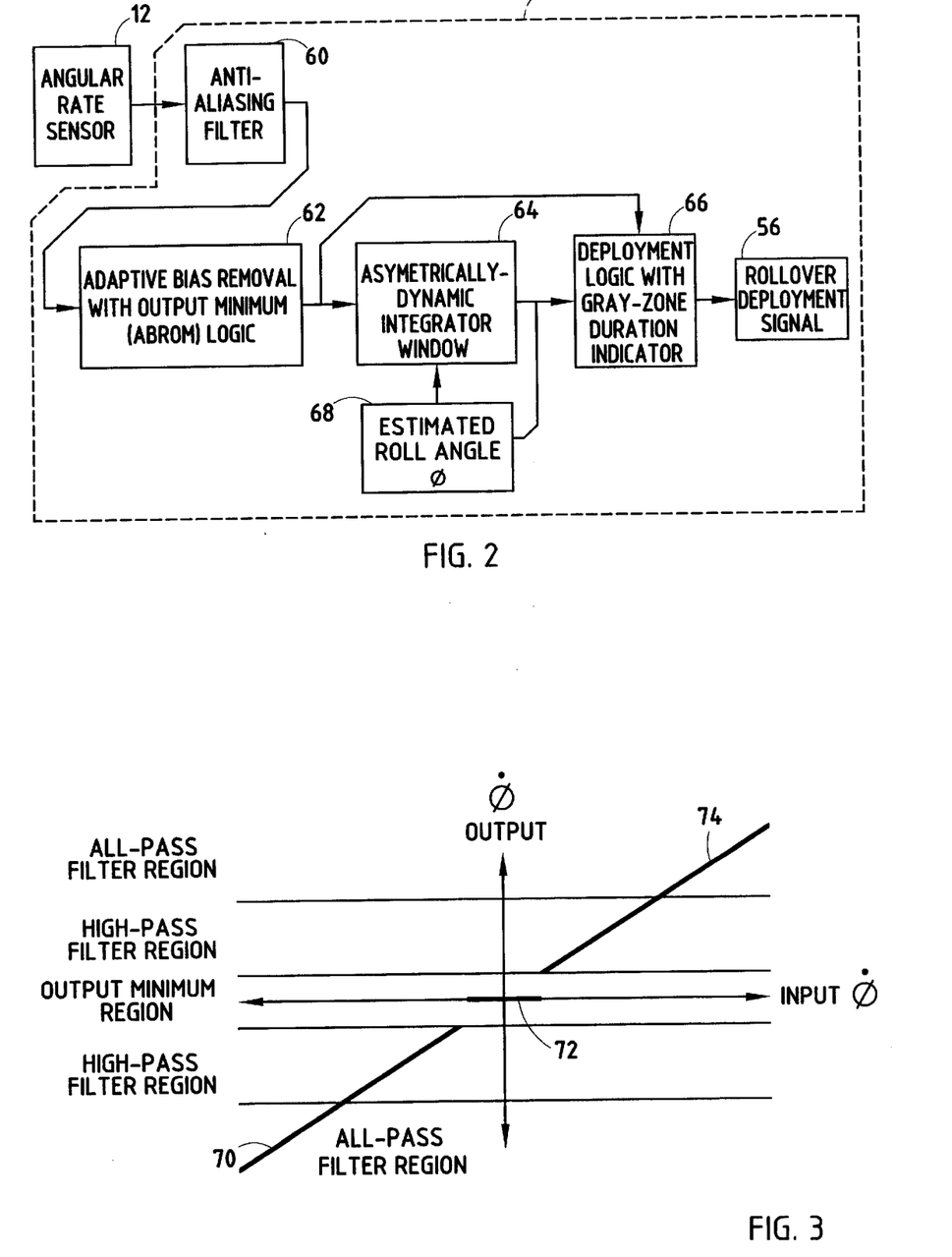
FIG. 2 is a block/flow diagram illustrating a rollover sensing algorithm for detecting vehicle rollover with the rollover sensing module according to the present invention.
FIG. 3 is a graph illustrating regions of operation of the adaptive bias removal with output minimum (ABROM) logic.

Referring to FIG. 2, the rollover detection algorithm is shown for detecting a vehicle rollover about the longitudinal axis of the vehicle. The rollover detection algorithm is preferably implemented in software that is stored in ready-only memory (ROM) internal to the MCU 20. However, it should be appreciated that the algorithm for detecting a rollover condition of a vehicle according to the present invention can be implemented with analog circuitry or digital processing. It should also be appreciated that while a vehicle rollover condition about the longitudinal axis of the vehicle is detected by the rollover detection algorithm logic, the algorithm can likewise be used to detect a vehicle pitchover about the lateral axis of the vehicle by sensing pitch angular rate in place of the roll angular rate.

The vehicle rollover detection algorithm receives a sensed angular (e.g., roll) rate signal $\dot{\phi}$ generated by the roll angular rate sensor 12, and processes the roll rate signal to detect a vehicle rollover condition. The vehicle rollover detection algorithm employs a roll rate signal generated from an angular roll rate sensor for determining rollover, and a pitch rate signal generated from an angular pitch rate sensor for determining pitchover, and angular rate signals generated by both the angular roll and pitch rate sensors for determining both rollover and pitchover of the vehicle.

The angular rate sensor 12 supplies a signal proportional to the rate of angular rotation about the axis, such as the roll rate about the longitudinal axis of the vehicle. With conventional angular rate sensors, the sensed signal typically includes a non-zero bias, even when the vehicle is at rest, falsely indicating the presence of a roll rate. In addition, the non-zero bias can change significantly with the temperature of the roll rate sensor 12, and can further drift in value as the sensor ages.

The rollover detection algorithm includes an anti-aliasing filter 60 which preferably employs a low-pass filter to get rid of high frequency signal content, thereby eliminating some corruption of the sensed angular rate signal. In addition, the rollover detection algorithm employs an adaptive bias removal with output minimum (ABROM) logic 62 for eliminating bias and further reducing noise associated with the sensed angular rate signal. The ABROM logic 62 effectively removes constant and slowly-varying offset bias, as well as small amplitude signals, thereby eliminating spurious noise and low level non-rollover signals, such as may occur on rough roads or during abusive vehicle driving conditions. The rollover detection algorithm preferably employs the ABROM logic 62 as is described later herein in greater detail in connection with FIGS. 8–10.

Referring briefly to FIG. 3, the various regions of operation for one example of an amplitude response of the ABROM logic 62 is illustrated therein. The sensed angular rate input signal $\dot{\phi}$ is divided into separate regions that determine the angular rate output signal $\dot{\phi}$. The ABROM logic 62 produces an output signal $\dot{\phi}$ set equal to zero when the angular rate input signal is below a minimum value, which defines an output minimum region, as is shown by line 72. The minimum value may be equal to ±five degrees/second, according to one example. When the angular rate input exceeds the output minimum value, the ABROM logic 62 output signal is substantially linear through the all-pass filter region and substantially linear for signals with frequency content substantially higher than the cut off frequency of the high pass filter through the high-pass filter regions as shown by lines 70 and 74. The high-pass filter region removes low-level constant or slowly varying signals from the output rate signal. According to one embodiment, the high-pass filter has a very low cut off frequency (0.1 Hz) to remove the effects of thermal drift and aging of the sensor.

The all-pass filter region eliminates bias for high amplitude signals during which the likelihood of a rollover event is more likely to occur. The all-pass filter region passes the input rate $\dot{\phi}$ to the output with a bias removed, but without filtering. Thus, with larger level signals, such as may occur during a rollover event, there is no delay or attenuation of the output signal $\dot{\phi}$. The operating regions are integrated to provide smooth operation over the entire operating range to reduce imperfections in the angular rate sensor, so that the resulting algorithm results achieve enhanced reliability.

Referring back to FIG. 2, the rollover detection algorithm employs an asymmetrically-dynamic integrator window 64 for computing a vehicle short-term accumulated roll angle (STARA) $\phi$ 62 based on the angular roll rate history. The asymmetrically-dynamic integrator window 64 preferably includes a finite impulse response (FIR) filter having a window length that varies in time depending on variables in the algorithm. The dynamics of this integration provides immunity to remaining sensor biases, noise, and non-rollover events, while providing for adequate detection of slow rollover events and two-step rollovers that may be encountered in vehicle usage.

The rollover detection algorithm further includes deployment logic with gray-zone duration indicator 66 which processes the STARA $\phi$ and the sensed and processed angular rate $\dot{\phi}$ and generates a rollover deployment signal 56. The combination of the STARA $\phi$ and the processed angular rate signal $\dot{\phi}$ are compared against two threshold curves to determine whether or not to generate the rollover deployment signal 56. If the combination of STARA $\phi$ and angular rate signal $\dot{\phi}$ exceeds an upper curve, deployment is commanded. If the combination of STARA $\phi$ and angular rate signal $\dot{\phi}$ is less than a lower curve, deployment is never commanded. However, if the combination of the STARA $\phi$ and rate signal $\dot{\phi}$ is between the upper and lower curves, within a gray-zone, the deployment logic monitors the signal duration within the gray-zone and dynamically adjusts the upper curve relative to the lower curve, to allow for timely deployment of certain vehicle maneuvers.

Asymmetrically-Dynamic Integrator Window

The asymmetrically-dynamic integrator window 64 computes the roll angle $\phi$ based on the angular roll rate $\dot{\phi}$ history by integrating the measured angular roll rate $\dot{\phi}$ over a dynamic time window. The measured angular roll rate is sampled at regular time intervals, and a finite, but variable, number of samples are included in the integration. The set of samples included in the integration extends backwards in time from the current sample to a point determined dynamically by the algorithm. The span of samples included in the integration calculation is called the window. The window is allowed to expand and contract within an upper limit and a lower limit. The size of the window is adjusted so that the window may expand or contract at different rates as discussed herein.

The sample point furthermost backward in time which is included in the integration window is referred to as the trailing edge. The finite size of the window determines which samples prior in time before the trailing edge will be removed from the calculation of the roll angle (STARA) ϕ. Since angular rate inputs prior to the window are not included in the integration, the current value of the STARA ϕ reflects only the relatively recent history of the vehicle roll behavior. This advantageously provides immunity to sensor errors, noise, rough road driving, and abnormal spirited driving of the vehicle. A further advantage of recording only recent roll history is that many rollover events requiring deployment of a safety-related device experience substantially all of the roll angle within a short period of time (about one second) from the onset of the event. This short period of time is roughly equal to the minimum window size, and is preferentially used as the default setting for the integration window during normal operation.

While a certain length of time window may be suitable for many possible rollover events, there exist certain events where a vehicle may still undergo a roll in one direction, hold a roll angle for a short time, such as two to three seconds, and then return to a substantially level condition. In such a situation, the integration window is expanded in size so that the roll rotation in one direction will offset the roll rotation during the return of the vehicle to substantially level driving.

The length of the integration window is determined by a time function. Under normal driving operations, when the vehicle roll angle is below an adjustable calibratible limit, such as eight degrees, the integration window length remains at the minimum value, such as one second, for example. This window size provides adequate history for sudden and violent rollover events, while at the same time providing immunity to spurious signals that may still pass through the ABROM logic 62 with the potential to give false roll angles. When the rollover detection algorithm senses a vehicle roll angle above the calibratible limit, the integration window is expanded in size. As a consequence, legitimate roll angle accumulations will remain in history for a longer period of time to accurately capture longer, or even two-step, rollover events, which can be important if the vehicle continues to rollover. There is an advantage in the window expansion matching the pace of the clock time so that the onset of a roll maneuver is retained.

Figure 4:
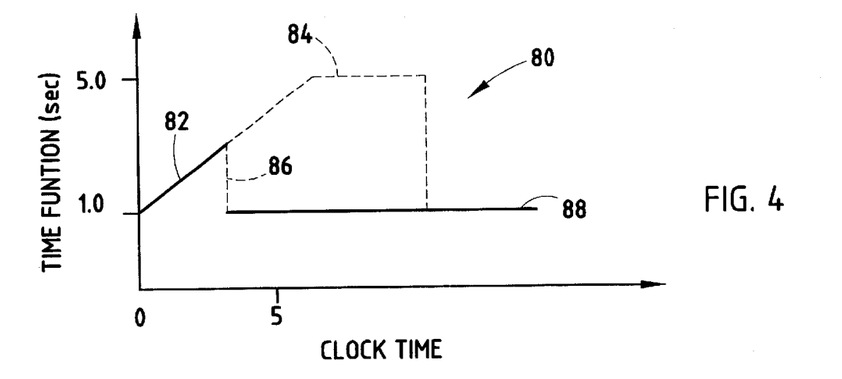
FIG. 4 is a graph illustrating examples of the integrator window and time length variations thereof.

One example of the time function operation of integration window 80 is illustrated in FIG. 4 where the vertical axis is the window length (n) in seconds, and the horizontal axis is the progression of normal clock time in seconds. At a clock time equal to zero, the time function sets the window 80 size n=1.0 seconds, but upon detection of a legitimate roll angle above a calibratible limit, the time function begins to increase the window 80 at a rate shown on line 82. The window size increases on line 82 until the roll angle returns back below the calibratible limit, at which time the window size is reduced immediately as shown on dashed line 86 to its minimum value on line 88, and the buffer is reset to all zeros. If the roll angle continues to exceed the calibratible limit, the integration window 80 is allowed to expand up to a predefined limit, such as line 84, and when the roll angle returns back below the calibratible limit, the window 80 contracts immediately to its minimum value on line 88. Because of the finite window length, any vehicle roll angle which persists longer than the maximum window length will be lost from history, and cause the STARA ϕ to return to a substantially zero value. In this case, the buffer is reset and the window length reduced to the minimum.

Should the vehicle maneuver continue into a rollover event requiring deployment, then the adaptable integration window allows a timely command of the appropriate safety device. However, if the roll angle recovers back to a substantially level driving condition, then the integration window contracts in size. According to the present invention, the window contraction can be immediately reduced to the minimum length if the STARA ϕ returns below a calibratable limit indicative of substantially level driving. In this case, the data buffer representing the time window is reset to contain all zero values. The value of time function (TF) is set to zero, and the buffer delay is reset to its minimum.

Figure 5A:
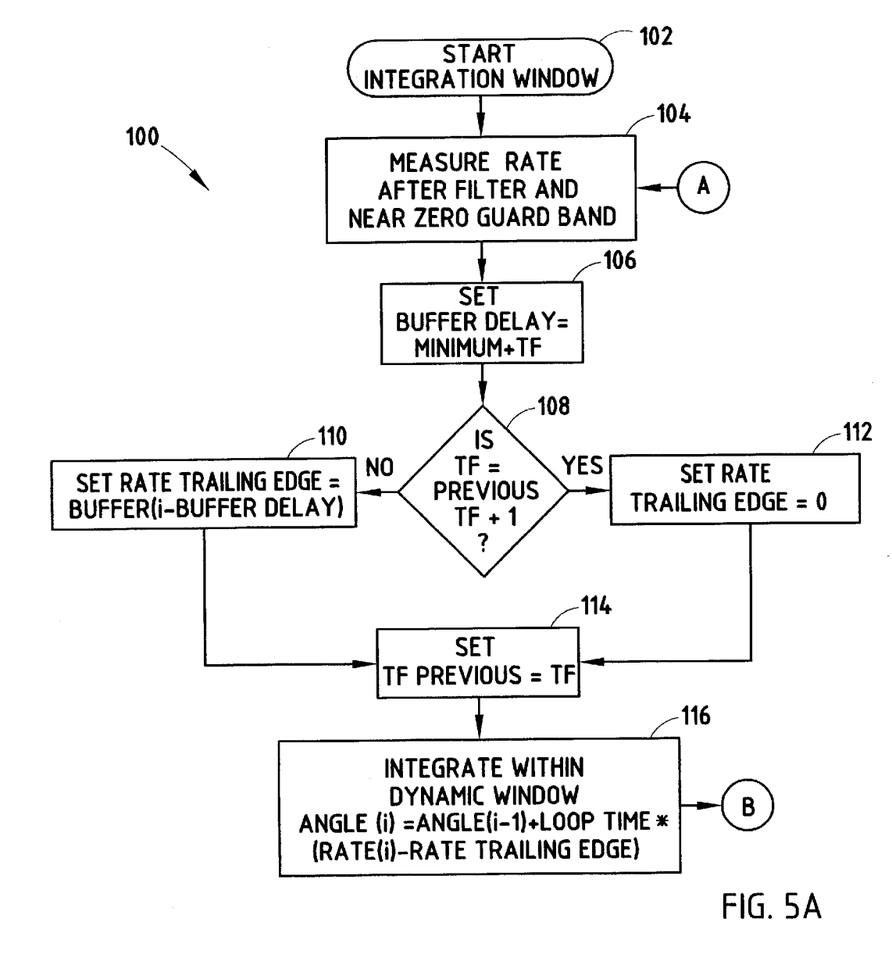
FIGS. 5A and 5B are a flow diagram illustrating the routine for the asymmetrically-dynamic integrator window.
Figure 5B:
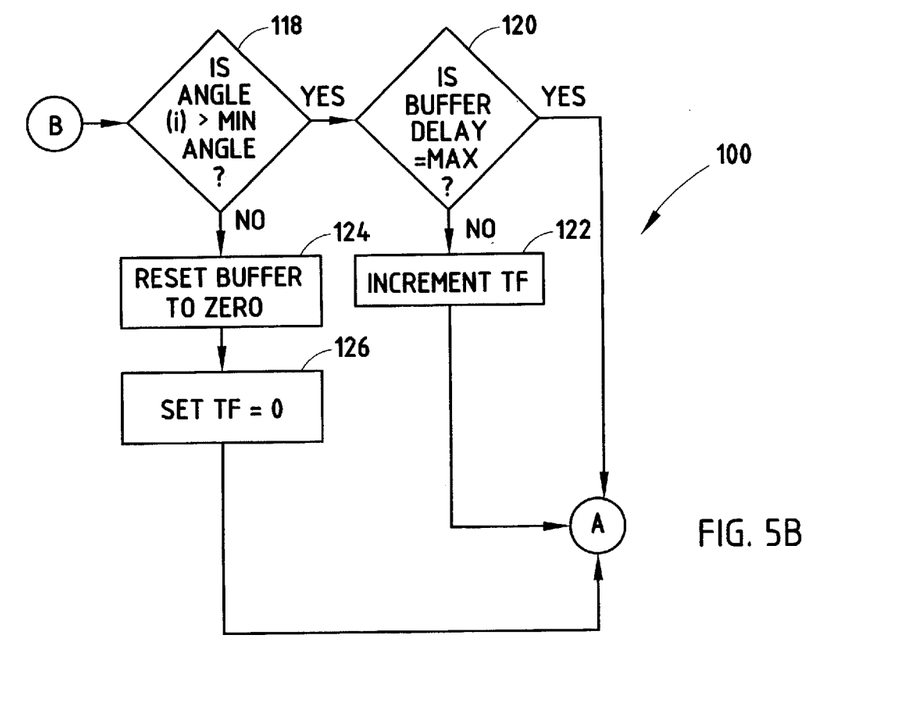

Referring to FIGS. 5A and 5B, a routine 100 of adjusting the integrator window and performing an asymmetrically-dynamic integration is illustrated therein. Integration routine 100 starts at step 102 and may undergo initialization of variables, memory allocation, and other duties common to embedded system applications. The next step 104 measures the angular roll rate after the filtering and near-zero guard band, as processed by ABROM logic 62, to provide a conditioned rate signal. In step 106, the buffer delay is set equal to a minimum plus a time function (TF). The buffer delay represents the total window length for the integration. The buffer is operated in a circular manner, and is set equal to the maximum window size. The buffer delay variable tracks the trailing edge of the window.

Proceeding to decision step 108, integration routine 100 checks for whether the time function (TF) has increased by one count since the previous algorithm loop. Because of the asymmetric nature of the integration window, the TF count increases only when the time function is increasing due to the onset of a roll event. During loop times when the time function is increasing, then the trailing edge sample, which had been processed in the previous loop integration, should not be further processed in the current loop integration. Accordingly, steps 110 and 112 either set the rate trailing edge variable to zero if the time function is increasing, or to the current point in the buffer (i) minus the buffer delay under all other cases. Thereafter, in step 114, a temporary variable TF is preserved for the next loop. In step 116, an actual integration is performed, in which the current (i) roll angle is updated from the previous value (i-1) plus the loop time multiplied by the difference between the current (i) angular rate and the angular rate at the trailing edge.

Following the integration in step 116, routine 100 proceeds to decision step 118 to determine whether the current (i) roll angle exceeds the minimum angle considered to be sufficient to extend the integration window. If this condition is met, then TF is incremented in step 122, so long as TF does not exceed the maximum buffer delay as determined by decision step 120. If the current (i) roll angle does not exceed the minimum angle considered to be sufficient to extend the integration window, then the buffer is reset with all zero values in step 124, and TF is set to zero in step 126. This erases all memory from the buffer, allowing only the STARA ϕ to remain. Control then returns back to step 104 and allows the value of the time function to update the buffer delay and hence the integration window size for the next loop. It should be appreciated that incrementing the time function preferably occurs at the same pace as the clock time so that the onset of a true roll event is retained. This, in effect, completes one integration loop of the asymmetrically-dynamic integration window routine 100.

Deployment Logic with Gray-Zone Duration Indicator

Figure 6:
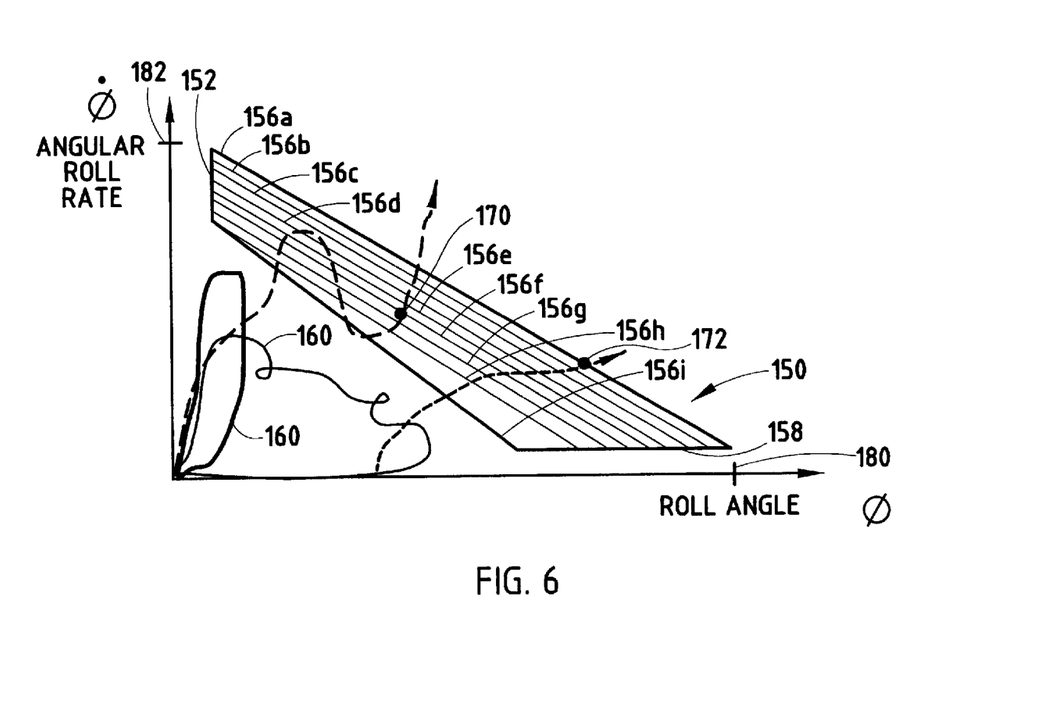
FIG. 6 is a graph illustrating a gray-zone duration indicator employed by the deployment logic.

The deployment logic with gray-zone duration indicator 66 generates a rollover deployment signal based on the STARA φ and sensed angular rate φ̇. Referring to FIG. 6, one example of a gray-zone 150 is illustrated. The deployment logic 66 compares the sensed angular rate φ̇ and the STARA φ against two threshold curves, namely an all-deploy (upper) curve (line) 156a, beyond which a deployment is always commanded, and a no-deploy (lower) curve (line) 156i, below which a deployment is never commanded. The region between these two curves is termed the gray-zone 150. The deployment logic monitors the signal duration within the gray-zone 150, and dynamically adjusts the all-deploy curve closer toward the no-deploy curve. This allows for timely deployment on corkscrew and other events involving complex vehicle motions, while a decay factor provides immunity to threshold non-trigger events, such as ramp jumps or off-road driving conditions.

The vertical axis of the gray-zone duration indicator is the instantaneous value of the angular roll rate φ̇ following processing by the ABROM logic 62. The horizontal axis is the current value of the STARA φ, as determined by the integrator window 64. For convenience of description herein, both roll rate φ̇ and roll angle φ are considered as absolute values, however, in general, these values can be either positive or negative numbers. It should also be important to appreciate that clockwise and anti-clockwise rollovers may have different requirements, and therefore may employ separate calibrations with minor changes to the deployment logic and an increase in the number of adjustable parameters.

The curvaceous paths illustrated in FIG. 6 represent the trace of pairwise points (angle, rate) for several representative rollover and near-rollover events. Paths 160 show non-rollover events, while paths 170 and 172 show rollover events. On the horizontal axis, representing the current roll angle value (STARA) φ, is the static stability angle 180 which is the roll angle at which the vehicle is perfectly balanced on two wheels (on the same side of the vehicle), and any further increase in angle will result in the vehicle tipping over onto its side. For a typical passenger vehicle, the static stability angle 180 for rollovers may range from 46 to 70 degrees, depending on the vehicle. Pitchover static stability angles may range from 65 to 82 degrees. On the vertical axis, representing the roll rate φ̇, is the impulse rollover rate 182 which, when applied at zero angle, will cause the vehicle to pass through the static stability angle and rollover. Between the two extreme values 180 and 182, and typically lower in magnitude, is the all-deploy line (curve), such as line 156a, which represents pairs of angle and rate, such that any pair of angle and rate on or above the all-deploy line will nominally indicate a deploy condition. The all-deploy line is shown here as a straight line, however, consideration of the vehicle suspension dynamics and other non-idealities in the vehicle structure may conspire to make this boundary a complex shape. The shape and slope of this line may also depend on additional input signals, such as vertical or lateral acceleration signals. However, for simplicity of discussion, the all-deploy line is assumed to be linear and of a single slope. It should be noted that the current invention embodiment extends to arbitrary complex shapes of the all-deploy line, without departing from the spirit of the present invention.

Within the gray-zone 150, pairwise points of rate and angle may involve either rollover events which have not yet accumulated sufficient energy to rollover, or very severe non-rollover events. The gray-zone 150 is considered an arbitrarily fine line between deploy and non-deploy events. Factors such as vehicle-to-vehicle variation and manufacturing tolerances in real-world components require a degree of separation between the all-deploy and no-deploy events when calibrating the rollover detection algorithm.

The gray-zone 150 is limited at or away from the axes to provide immunity against pairs of angle and rate that may instantaneously exceed the all-deploy line, but are of insufficient severity to command a deployment. The left boundary 152 of the gray-zone 150 is defined by a minimum roll angle required before allowing a deployment. The bottom boundary 158 of the gray-zone 150 is defined by a minimum angular roll rate at which the algorithm will be allowed to deploy, and is used to prevent deployment on very slow roll events, such as roll experienced in a parking lot sink hole. The minimum roll angle 152 and roll rate 158 are calibratible parameters that are set in the algorithm.

Vehicle events causing the angle and rate pair to spend an appreciable amount of time within the gray-zone 150 are given special consideration by the present invention. In crash events, the vehicle may undergo complex motions before eventually rolling over. The ability to dynamically adjust the all-deploy line is allowed if the time duration within the gray-zone 150 is appreciable. For these types of events, the gray-zone time duration is used to lower the all-deploy line closer to the no-deploy line. The longer the gray-zone time duration, the more likely the event will trigger deployment of safety devices.

Figure 7A:
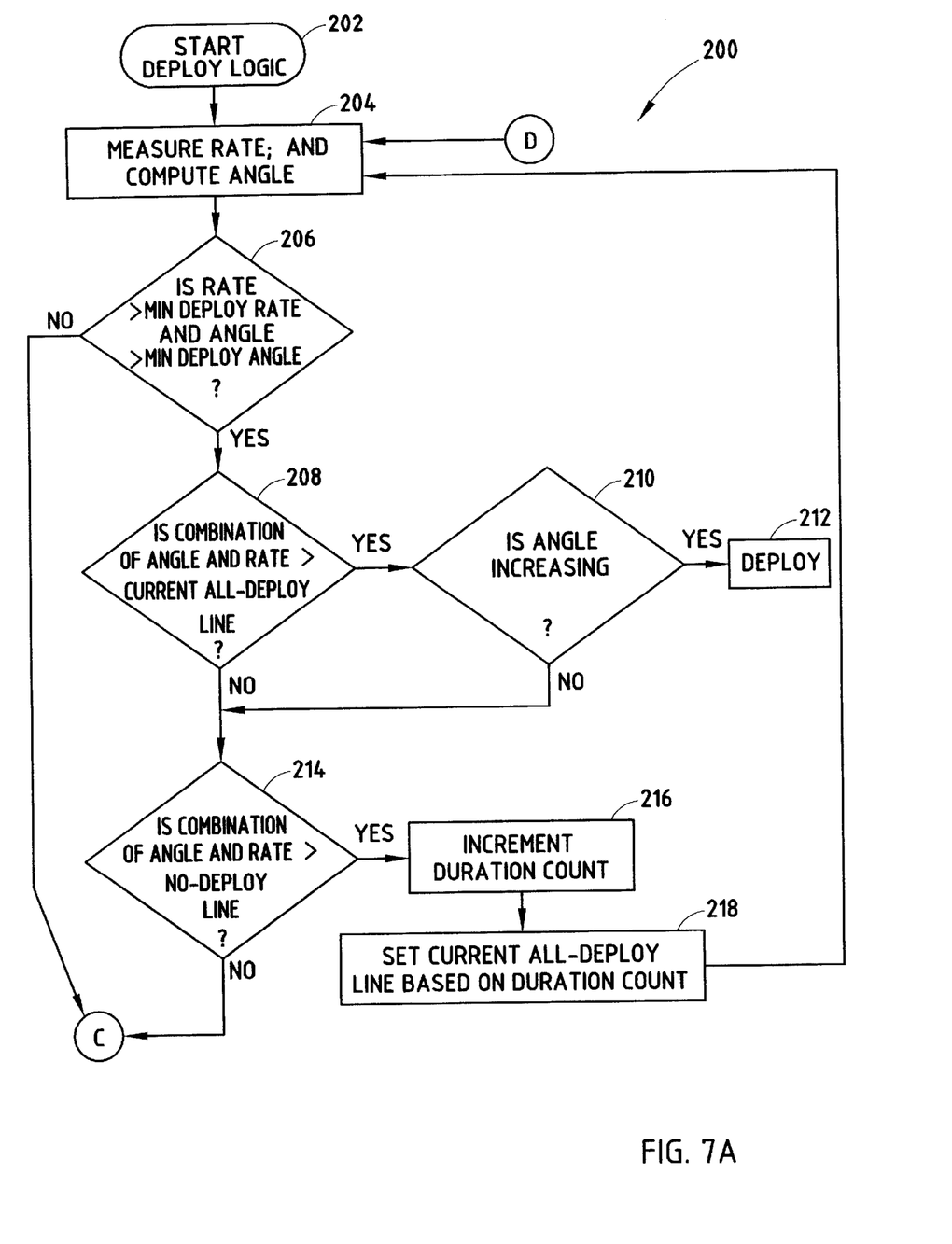
FIGS. 7A and 7B are a flow diagram illustrating the routine for the deployment logic.
Figure 7B:
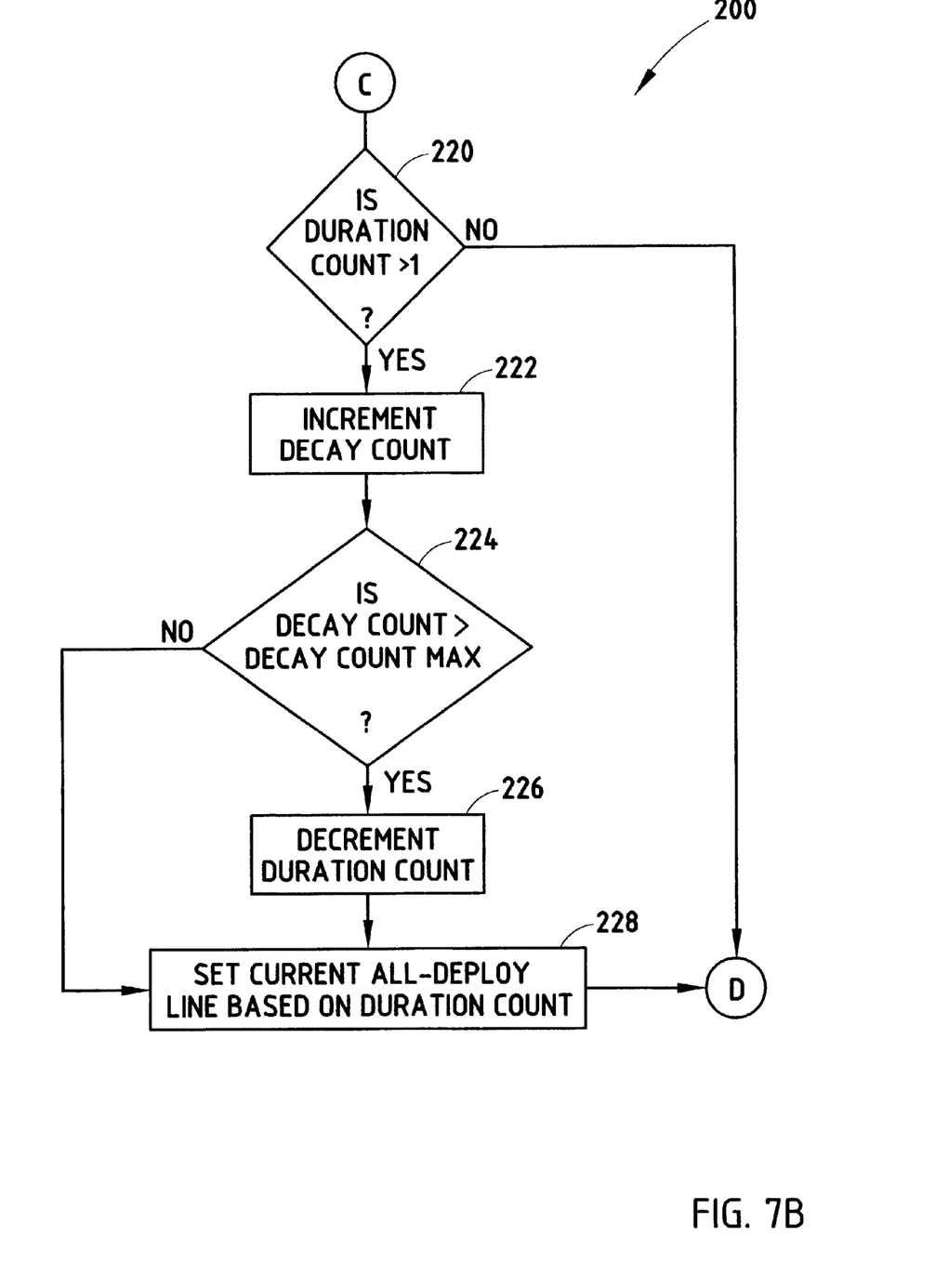

The deployment logic routine 200 is illustrated in FIGS. 7A and 7B for adjusting the all-deploy line based on the gray-zone time duration. The deployment logic routine 200 begins at step 202 and initializes variables, such as counters, and then proceeds to step 204 to receive, as inputs, the computed roll angle STARA φ and the measured processed angular rate φ̇. Next, in decision block 206, routine 200 checks if the two following conditions are met: (1) the angular rate is above the minimum rate value; and (2) the computed STARA is above the minimum angle value. For clarity, only positive values are considered herein, but the concept is equally valid for negative values and negative rates. Next, in decision step 208, deployment logic routine 200 checks for whether the pairwise combination of roll angle and rate exceeds the all-deploy line. If the all-deploy line is exceeded, then decision step 210 checks if the STARA has actually been increasing since the previously iteration through the deployment loop. This concept of using previous iterations to look for an increasing angle may be extended to include a weighted sum of several prior samples of the STARA φ. Provided the STARA φ has been increasing, a rollover deployment signal is initiated in step 212. Otherwise, routine 200 proceeds to decision step 214.

The check provided in step 210 ensures that deployment will only be commanded at a point in time when the STARA φ is actually increasing towards the rollover point. In addition, this check provides additional immunity against a class of vehicle motions where a substantial angle has already been accumulated, and then the vehicle experiences a sharp angular rate in the opposite direction. Without this check, such a non-rollover driving scenario could possibly lead to an inadvertent deployment. In an embodiment where separate calibrations are used for clockwise and anti-clockwise rollovers, the logic which checks for whether the roll angle is increasing instead becomes a check to verify that the roll angle and the roll rate are of the same sign.

If the pairwise combination of roll angle and roll rate is below the current all-deploy line, or if the roll angle is not increasing, then decision step 214 checks for whether the roll angle and rate pair varies within the gray-zone, by being above the no-deploy line. If the angle and rate pair is within the gray-zone, then the duration counter is incremented in step 216, and the all-deploy line is adjusted in step 218. Adjusting the all-deploy line based on the duration count of the roll angle and rate pair being within the gray-zone provides timely deployment for a wide range of rollover events. In scenarios where the rollover is initiated suddenly, even violently, such as a lateral curb trip or a lifting knock-over impact, the roll angle and rate pair will rise rapidly, and quickly surpass the all-deploy line. However, during rollovers involving complex motions, such as a corkscrew, certain fallovers, rollovers during off-road driving, or concatenated events leading up to a rollover, the vehicle may hover briefly, or undergo auxiliary impacts before reaching a critical point requiring deployment. If the vehicle attitude moves within the gray-zone momentarily, but then returns to a substantially level position, no deployment is typically required. However, a more sustained duration within the gray-zone may also indicate a severe event in progress and, in such cases, when the vehicle motion finally advances inexorably towards rollover, deployment is often required without delay. To accomplish these goals, the gray-zone duration indicator will gradually reduce the all-deploy line, such as from line 156a to line 156b or further to any of lines 156c–156h, thereby effectively collapsing the gray-zone to allow this class of events to achieve a timely deployment when needed.

Adjustment of the all-deploy line may be regarded as a linear interpolation of the end points of the all-deploy line towards the no-deploy line. Each advance of the all-deploy line closer to the no-deploy line is made based on the duration of the angle and rate pairwise samples being within the gray-zone. A sufficiently long duration within the gray-zone will eventually command a deployment. The rate of advance of the all-deploy line towards the no-deploy line is an adjustable or calibratible parameter of the algorithm. According to one example, three to five samples within the gray-zone are required before the all-deploy and no-deploy lines coincide. While a linear straight line interpolation is described herein, the present invention also extends to non-linear interpolation, and piece-wise linear boundaries of the gray-zone. Adjustment of the all-deploy line should be reset back to the original default value, after a near-rollover event concludes.

If the pairwise combination of roll angle and rate is determined not to be above the no-deploy line as determined in step 214, control passes to decision step 220 to check if the duration count is greater than one. If the duration count exceeds a value of one, routine 200 increments the decay count in step 222, and then proceeds to decision step 224 to check if the decay count is greater than a decay count maximum value. Once the decay counter reaches a preset maximum count, then the duration count is decremented in step 226, and the all-deploy line is adjusted based on the duration count in step 228. The purpose of the decay count is to preserve the duration count for a brief period of time should the vehicle motion pass out of the gray-zone momentarily. The decay count maximum value is set so that concatenated events receive a timely deployment, while rough road or near-rollover events with only periodic excursions into the gray-zone receive immunity offered by the default all-deploy threshold. After the adjustments have been made to the all-deploy line, control is returned to step 204 for the next loop of sample iterations for routine 200.

Adaptive Bias Removal with Minimum Output (ABROM) Logic

The ABROM logic 62 processes digitally sampled input signals in such a way that constant or slowly-varying biases are removed, small noise signals are eliminated, and large-amplitude signals are passed with an adjusted bias to achieve signals with optimal accuracy. The ABROM logic 62 is particularly useful for processing signals sensed via an angular rate sensor for use in the rollover detection apparatus of the present invention. However, it should be appreciated that the ABROM logic 62 is also useful for processing signals generated by other sensing devices for use in various applications, without departing from the teachings of the present invention.

The ABROM logic 62 has three primary regions of operation according to the embodiment shown. These three primary regions of operation are shown in FIG. 3. In the high-pass filter region, for small amplitude signals below an adaptive threshold, a high-pass filter is applied. In the all-pass region, for larger amplitude signals above the adaptive threshold, the signals are passed unchanged, except for the removal of the most recent bias estimate, which is derived from the high-pass filter. If the output of the high-pass filter is below a minimum output level, then the output is forced to zero in an output minimum region.

The operation of the ABROM logic 62 provides a number of benefits by providing removal of static or slowly moving bias from a sensor generated signal. The minimum output function further provides for faster recovery from drifting input values, as compared to traditional filter approaches. The all-pass region above the adaptive threshold corrects for sensor biases, but otherwise passes the input signal to the output. This avoids filter delays associated with digital filters, and avoids attenuation of low-frequency components of the signal above the adaptive threshold. The ABROM logic 62 is applicable to systems which are monitored for intermittent, asynchronous signals, especially where bias or offset changes are poorly tolerated. For rollover detection algorithms, especially those which use integration of a sensor generated signal, the ABROM logic 62 allows for rapid response times with minimal errors.

Figure 8:
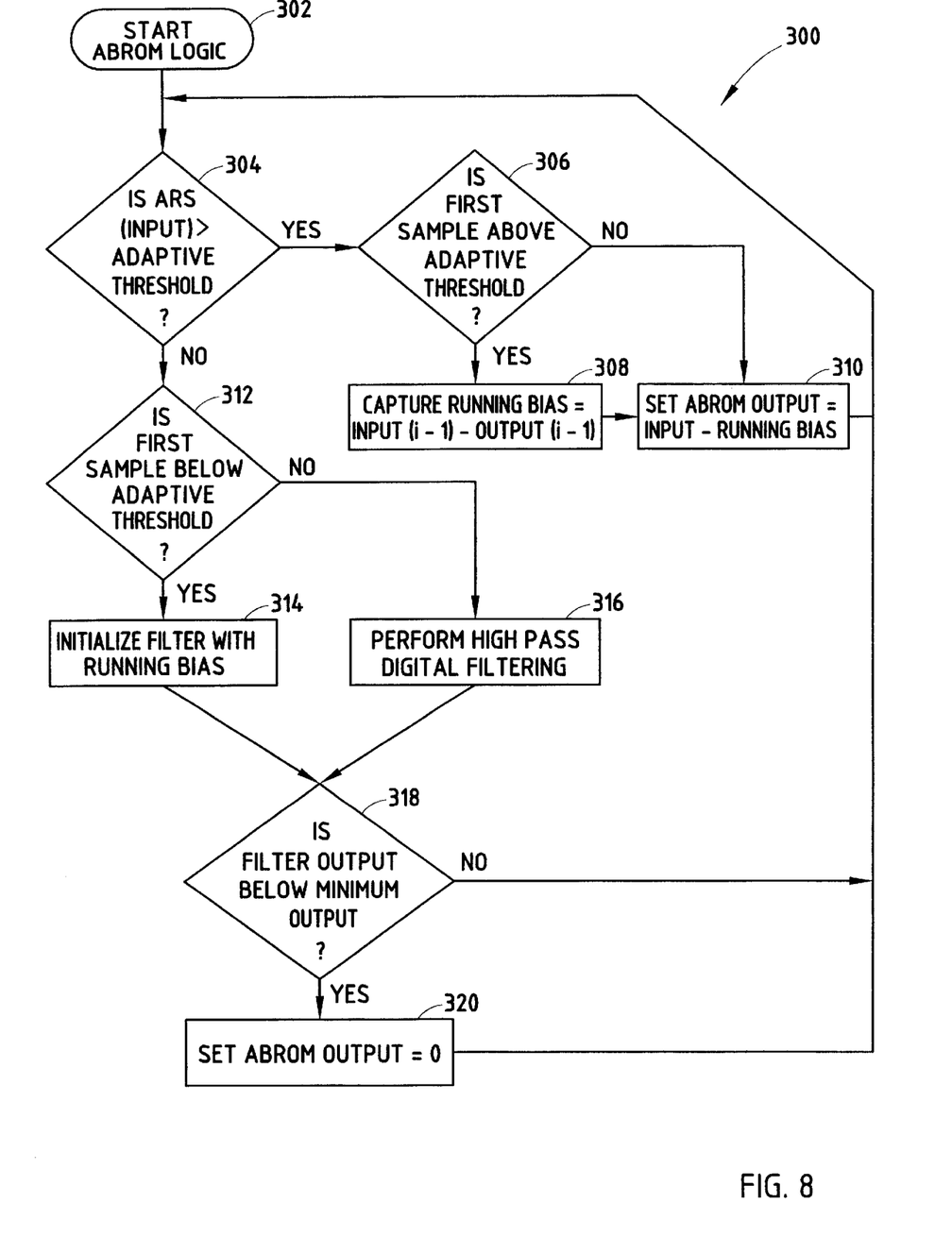
FIG. 8 is a flow diagram illustrating the routine for the adaptive bias removal with output minimum logic.

Referring to FIG. 8, an ABROM control routine 300 is illustrated therein. Routine 300 begins at step 302, and in decision step 304 checks if the angular rate sensor (ARS) input is greater than an adaptive threshold. The absolute value of the input may be used, or different thresholds can be used on either side of zero, if desired. The check performed in decision step 304 reduces microprocessor processing time when a signal excursion above the adaptive threshold occurs. These are events intended to be detected or measured, and once such events begin, the signal should be processed as rapidly as possible.

When the first signal sample exceeds the adaptive threshold, a running bias is fixed and stored until the signal amplitude drops below the adaptive threshold. This is achieved by checking if the first sample is above an adaptive threshold in step 306 and, if so, capturing a running bias equal to the difference of the input (i-1) minus the output (i-1) in step 308. Otherwise, if the first sample is not above the adaptive threshold, in step 310 the ABROM output is set equal to the difference of the input minus the running bias. The running bias is computed by subtracting the input signal from the high-pass filter output at the most recent prior time step. The frequency response of the high-pass filter is such that constant or slowly varying biases are removed from the input such that the high-pass filter output is at or near the nominal zero value (in the absence of large-amplitude signals).

The ABROM logic is particularly useful for situations where the signals of interest are of relatively large amplitude and of relatively brief duration, as compared to the time constant of the high-pass filter. In these cases, the running bias is a good approximation of the true bias. The longer the duration of such excursions, the more error that can occur by using the running bias. While prior signal excursions above the adaptive threshold could cause the running bias to vary from the true bias, two methods are used to minimize these affects, namely, (1) reinitalizing the high-pass filter after a large amplitude excursion; and (2) using the output minimum, as described below.

Samples above the adaptive threshold (an absolute value) are passed without attenuation or delay, but are corrected by subtracting off the running bias, so that low-frequency components of the large amplitude signals will be accurately reflected in the output. For input signals which do not exceed the adaptive threshold, routine 300 proceeds to step 312 to check if the first sample is below the adaptive threshold. When the first sample is below the adaptive threshold, the filter is initalized with the running bias in step 314, before proceeding to decision step 318. However, if the first sample is not below the adaptive threshold, high-pass digital filtering is performed in step 316, prior to proceeding to decision step 318. Decision step 318 checks if the filter output is below a minimum output and, if not, routine 300 returns to step 304. However, if the filter output is below the minimum output, then routine 300 proceeds to step 320 to set the ABROM output equal to zero, prior to returning to step 304.

The running bias is the best estimate of the true bias, although it may change slightly for the duration of the signal excursion. By using the running bias as a starting point for the high-pass filter, the only error that the high-pass filter needs to correct for is the small amount of bias shift that may have occurred during the brief signal excursion above the adaptive threshold, thereby necessitating the need to correct the full amount of the bias upon initalization at a zero value before experiencing significant overshoot if the filter was used for the entire signal excursion.

It is preferred that the high-pass filter be a first order infinite impulse response (IIR) filter, such as a Butterworth filter. However, the ABROM logic can be applied to filters of any order, by using successive time steps to initialize successive terms of the digital filter. Reinitializing the filter with the running bias effectively starts up the filter where it left off at the start of the signal excursion above the adaptive threshold. Any bias shift which occurred, or signal attenuation below the adaptive threshold, is all that remains for the high-pass filter to remove. Since the shifts are small, in general, the recovery is much more rapid than traditional high-pass filters.

The recovery time can be reduced with a minimum output processing technique, as described as follows. The intermediate output of the ABROM logic is either the high-pass filter output or the bias-adjusted signal if the input is greater than the adaptive threshold. If the output falls below a minimum output level, the output is set identically equal to zero. This operation allows fast recovery from any extended periods of large-amplitude inputs and reduces errors when the ABROM output is integrated, such as for rollover sensing.

Figure 9:
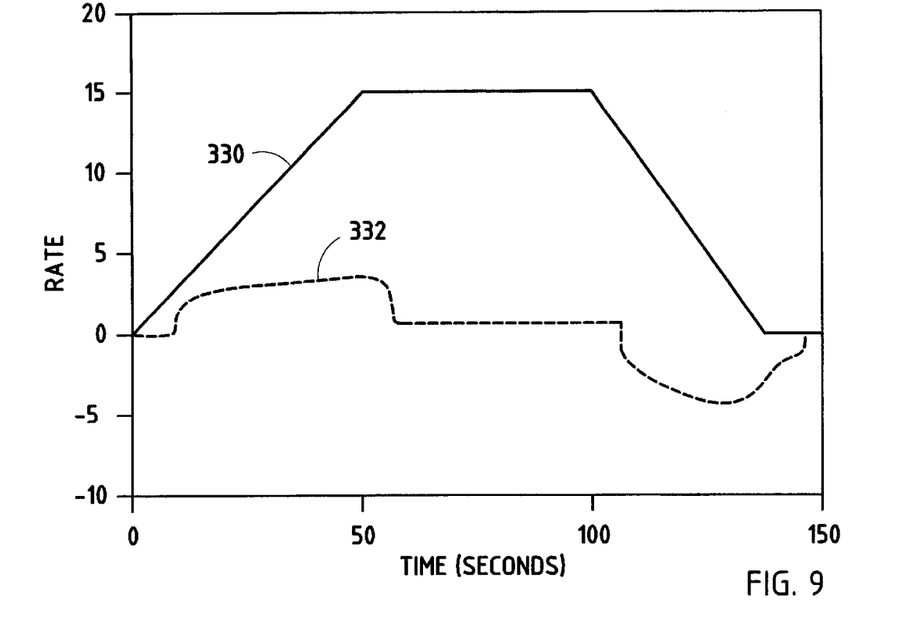
FIG. 9 is a graph illustrating bias removal from a sensed signal achieved with the adaptive bias removal with output minimum logic.

FIG. 9 illustrates the results of the ABROM logic for removing bias when the bias drifts up rapidly to a high value, resides at the high value briefly, then drifts back to zero, according to one example. The solid line 330 represents the input to the ABROM logic, and the dashed line 332 represents the output. At the early rise levels, the output 332 remains at zero according to the minimum output function. As the input signal 330 continues to rise, the output 332 begins to be attenuated according to the functioning of the high-pass filter, demonstrating asymptotic behavior up to the plateau of the input signal 330 at a time period of about 50 seconds. When the bias remains at the high level, the high-pass filter causes the output to decay towards zero, until the output 332 falls below the minimum output, and then drops immediately to zero. This demonstrates a fast recovery time. When the input 330 begins to fall, at about 100 seconds, the same behavior is exhibited, except in the reverse polarity. Accordingly, the downward ramp of the input signal 330 is greater than the input ramp, leading to a higher output 332 deviating from zero. Accordingly, the bias removal of the ABROM logic does not come at the expense of signal fidelity for larger amplitude signals as described below.

Figure 10:
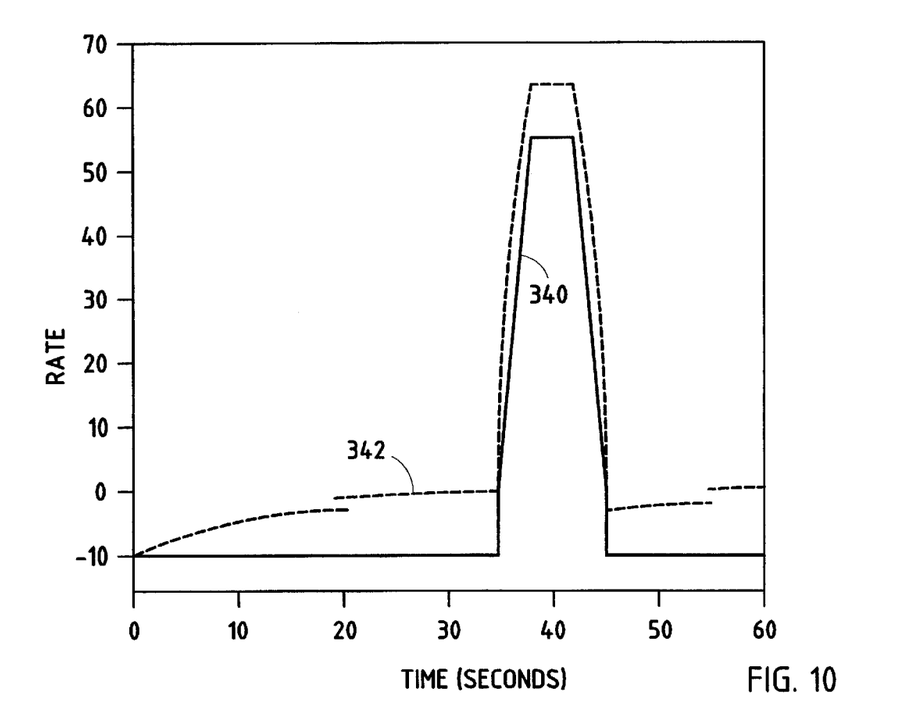
FIG. 10 is a graph further illustrating bias removal from a sensed signal achieved with the adaptive bias removal with minimum output logic.

Referring to FIG. 10, a large amplitude signal excursion is shown superimposed on a constant bias. The constant bias is set to a rate of approximately minus ten (−10) at which point the ABROM logic is initalized. The signal excursion occurs at about forty (40) seconds, and has a peak amplitude rate of about 60, referenced to the bias. The maximum signal level is reached within about two seconds, and then has a plateau for several seconds, before ramping back down to the bias level. According to this example, the adaptive threshold limit is set to a value of about twenty (20), and the minimum output level is set to a value of about two (2). The solid line 340 represents the input signal and the dashed line 342 represents the output. At time equals zero, the output 342 initalizes to the first signal at a value of about minus ten (−10), but then corrects toward a zero value with a time constant characteristic of the high-pass filter. At approximately twenty-one (21) seconds, the output 342 (an absolute value) drops below the minimum output, and the output 342 goes to zero. When the signal excursion begins at thirty-five (35) seconds, the output begins to climb and exactly matches the input signal except for the shift equal to the running bias. The running bias is the instantaneous difference between the input 340 and the output 342 at the moment the signal exceeds the adaptive threshold. The running bias is held fixed until the signal returns below the adaptive threshold.

It is important to note that there is substantially no signal distortion during the plateau of the input signal around forty (40) seconds. When the signal returns back below the adaptive threshold, the running bias is used to initialize the high-pass filter. There may still be some recovery needed, because of the action of the high-pass filter attenuating the signal as it begins to climb, but before the adaptive threshold has been reached. This overshoot can be further reduced by calculating the running bias at the sample point further back in time, assuming there is no history of other events. As an option, the running bias can be computed at any time point in the past, or an average of such points, for according to logic which detects the presence/absence of the previous signal history. While these embodiments are discussed herein for use in a rollover detection algorithm, it should be appreciated that the ABROM logic may be employed for use in various applications.

The rollover detection algorithm with minimum sensor set as described herein provides full functionality over a wide range of rollover events, while using only a single angular rate sensor. The integrator window and gray-zone duration indicator deployment logic provides sufficient flexibility such that a suitable calibration of the adjustable parameters of the algorithm will ensure timely deployment during rollover events, and adequate immunity during non-rollover events. The present rollover detection algorithm offers a low-cost implementation that is desirable for mass-market applications such as in the automotive industry.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A rollover detection apparatus for detecting an anticipated overturn condition for a vehicle, said apparatus comprising:
    an angular rate sensor for sensing attitude rate of change of a vehicle and producing an output signal indicative thereof;
    an integrator for integrating the sensed attitude rate of change signal and producing an attitude angle, said integrator having a variable time window;
    a comparator for comparing the attitude angle to a threshold value; and
    an output for providing a vehicle overturn condition signal based on said comparison.

2. The rollover sensing apparatus as defined in claim 1, wherein said integrator comprises an asymmetrically-dynamic integrator having the variable time window that varies based on the attitude angle.

3. The rollover detection apparatus as defined in claim 2, wherein said variable time window increases when the attitude angle exceeds a window threshold and decreases when the attitude angle is below the window threshold.

4. The rollover sensing apparatus as defined in claim 1, wherein said integrator comprises a finite impulse response filter.

5. The rollover sensing apparatus as defined in claim 1, wherein said comparator compares the attitude angle to a variable threshold value that varies based on said sensed attitude rate of change and said attitude angle.

6. The rollover sensing apparatus as defined in claim 1, wherein said angular rate sensor senses roll angular rate of said vehicle, and said comparator determines a rollover condition of said vehicle about a longitudinal axis of the vehicle.

7. The rollover sensing apparatus as defined in claim 1, wherein said angular rate sensor senses pitch angular rate of said vehicle, and said comparator determines a pitchover condition of said vehicle about a lateral axis of the vehicle.

8. The rollover sensing apparatus as defined in claim 1 further comprising bias removal logic for removing bias from said sensed attitude rate of change signal.

9. The rollover sensing apparatus as defined in claim 8, wherein said bias removal logic high-pass filters the sensed attitude rate of change signal below a first threshold and passes the sensed attitude rate of change signal above the first threshold.

10. The rollover sensing apparatus as defined in claim 9, wherein said bias removal logic sets the attitude rate of change to substantially zero for small-amplitude signals below a second threshold which is less than the first threshold.

11. The rollover sensing apparatus as defined in claim 1 further comprising an anti-aliasing filter coupled to an output of said angular rate sensor.

12. The rollover sensing apparatus as defined in claim 1, wherein said comparator comprises deployment logic for comparing the attitude angle and sensed attitude rate of change with a threshold curve.

13. The rollover sensing apparatus as defined in claim 12, wherein said threshold curve is variable based on an amount of time elapsed during a near rollover event.

14. A rollover detection apparatus for detecting an anticipated overturn condition for a vehicle, said apparatus comprising:
    an angular rate sensor for sensing attitude rate of change of a vehicle and producing an output signal indicative thereof;
    an integrator for integrating the sensed attitude rate of change signal and producing an attitude angle;
    deployment logic for comparing the attitude angle and sensed attitude rate of change with a variable threshold, said variable threshold defining a region of deployment, a region of no deployment, and a gray-zone which varies as a function of time; and
    an output for providing a vehicle overturn condition signal based on said comparison.

15. The rollover detection apparatus as defined in claim 14, wherein said integrator comprises a variable time window.

16. The rollover detection apparatus as defined in claim 15, wherein said variable time window increases when the attitude angle exceeds a window threshold and decreases when the attitude angle is below the window threshold.

17. The rollover detection apparatus as defined in claim 14, wherein said variable time window increases at a first rate and decreases at a different second rate.

18. A rollover detection apparatus for detecting an overturn condition for a vehicle, said apparatus comprising:
    an angular rate sensor for sensing attitude rate of change of a vehicle and producing an output signal indicative thereof;
    bias removal logic for removing bias from said sensed attitude rate of change signal, said bias removal logic including a high-pass filter for high-pass filtering the sensed attitude rate of change signal when below a first threshold, and said bias removal logic passing the sensed attitude rate of change signal when above the first threshold;
    an integrator for integrating the sensed attitude rate of change signal and producing an attitude angle;
    a comparator for comparing the attitude angle to a threshold value; and
    an output for providing a vehicle overturn condition signal based on said comparison.

19. The rollover detection apparatus as defined in claim 18, wherein said bias removal logic sets the sensed attitude rate of change signal to substantially zero when the sensed attitude rate of change signal is below a second threshold which is less than the first threshold.

20. The rollover sensing apparatus as defined in claim 18, wherein said integrator comprises a variable time window that varies based on the attitude angle.

21. The rollover detection apparatus as defined in claim 20, wherein said variable time window increases when the attitude angle exceeds a window threshold and decreases when the attitude angle is below the window threshold.

22. The rollover sensing apparatus as defined in claim 18, wherein said comparator compares the attitude angle to a variable threshold value that varies based on said sensed attitude rate of change and said attitude angle.

23. The rollover sensing apparatus as defined in claim 18, wherein said angular rate sensor senses roll angular rate of said vehicle, and said comparator determines a rollover condition of said vehicle about a longitudinal axis of the vehicle.

24. The rollover sensing apparatus as defined in claim 18, wherein said angular rate sensor senses pitch angular rate of said vehicle, and said comparator determines a pitchover condition of said vehicle about a lateral axis of the vehicle.

25. The rollover sensing apparatus as defined in claim 18, wherein said comparator comprises deployment logic for comparing the attitude angle and sensed attitude rate of change with a threshold curve.

26. The rollover sensing apparatus as defined in claim 25, wherein said threshold curve is variable based on an amount of time elapsed during a near rollover event.

27. A bias removal device for removing bias from a sensed signal, said bias removal device comprising:
    an input for receiving a sensed signal from a sensor;
    a high-pass filter for filtering the sensed signal when the sensed signal has an amplitude below a first threshold;
    an all pass region for passing the sensed signal when the sensed signal has an amplitude above the first threshold; and
    an output for providing a bias removed output signal.

28. The bias removal device as defined in claim 27 further comprising logic for setting the bias removal output signal to substantially zero when the sensed signal is below a second threshold which is less than the first threshold.

29. The bias removal device as defined in claim 27, wherein said sensed signal is generated by a rate sensor.

30. The bias removal device as defined in claim 29, wherein said rate sensor comprises an angular rate sensor.

31. A method for detecting an anticipated overturn condition of a vehicle, comprising the steps of:
    sensing an attitude rate of change of a vehicle and producing an output signal indicative thereof;
    integrating the sensed attitude rate of change signal during a time window to generate an attitude angle;
    varying the time window based on the attitude angle;
    comparing the attitude angle to a threshold value; and
    providing an output signal based on the comparison.

32. The method as defined in claim 31, wherein said step of varying the time window comprises:
    increasing the time window when the attitude angle exceeds a window threshold; and
    decreasing the time window when the attitude angle is below the window threshold.

33. The method as defined in claim 31, wherein said step of comparing the attitude angle to a threshold value comprises comparing the attitude angle to a variable threshold value that varies based on the sensed attitude rate of change and attitude angle.

34. The method as defined in claim 31, wherein said step of sensing comprises sensing a roll angular rate of the vehicle for determining a rollover condition of the vehicle about a longitudinal axis of the vehicle.

35. The method as defined in claim 31, wherein said step of sensing comprises sensing pitch angular rate of the vehicle for determining a pitchover condition of the vehicle about a lateral axis of the vehicle.

36. The method as defined in claim 31 further comprising the step of removing bias from the sensed attitude rate of change signal.

37. The method as defined in claim 36, wherein said step of removing bias comprises high-pass filtering the sensed attitude rate of change signal when below a first threshold and passing the sensed attitude rate of change signal when above the first threshold.

38. The method as defined in claim 37, wherein said step of removing bias further comprises setting the attitude rate of change to substantially zero when the sensed attitude rate of change signal is below a second threshold which is less than the first threshold.

39. The method as defined in claim 31, wherein said step of comparing comprises comparing the attitude angle and sensed attitude rate of change with a threshold curve which varies based on an amount of time elapsed during a near rollover event.

40. A method for detecting an anticipated overturn condition of a vehicle, comprising the steps of:
    sensing an attitude rate of change of a vehicle and producing an output signal indicative thereof;
    integrating the sensed attitude rate of change signal during a time window to generate an attitude angle;
    comparing the attitude angle and sensed attitude rate of change with a variable threshold, said variable threshold defining a region of deployment, a region of no deployment, and a gray-zone which varies as a function of time; and
    providing an output signal based on the comparison.

41. The method as defined in claim 40 further comprising the steps of:
    increasing size of the time window when the attitude angle exceeds a window threshold; and
    decreasing size of the time window when the attitude angle is below the window threshold.

42. The method as defined in claim 41, wherein said time window increases at a first rate and decreases at a different second rate.

43. A method for detecting an anticipated overturn condition of a vehicle, comprising the steps of:
    sensing an attitude rate of change of a vehicle and producing an output signal indicative thereof;
    removing bias from said sensed attitude rate of change signal, including high-pass filtering the sensed attitude rate of change signal when below a first threshold and passing the sensed attitude rate of change signal when above the first threshold;
    integrating the sensed attitude rate of change signal and producing an attitude angle;
    comparing the attitude angle to a threshold value; and
    providing an output signal based on the comparison.

44. The method as defined in claim 43, wherein said step of removing bias further comprises setting the attitude rate of change signal to substantially zero when the sensed attitude rate of change signal is below a second threshold which is less than the first threshold.

45. The method as defined in claim 43, wherein said step of integrating further comprises integrating over a variable time window, and increasing the time window when the attitude angle exceeds a window threshold and decreasing the time window when the attitude angle is below the window threshold.

46. The method as defined in claim 43, wherein said step of comparing comprises comparing the attitude angle to a variable threshold value that varies based on said sensed attitude rate of change and said attitude angle.

47. The method as defined in claim 46, wherein said step of comparing comprises deployment logic for comparing the attitude angle and sensed attitude rate of change signal with a threshold curve.

48. The method as defined in claim 47 further comprising the step of varying the threshold curve based on an amount of time elapsed during a near rollover event.

49. A method for removing bias from a sensed signal, comprising the steps of:

receiving a sensed signal from a sensor;

filtering the sensed signal with a high-pass filter when the sensed signal has an amplitude below a first threshold;

passing the sensed signal when the sensed signal has an amplitude above the first threshold; and providing a bias removed output signal.

50. The method as defined in claim 49 further comprising the step of setting the bias removal output signal to substantially zero when the sensed signal is below a second threshold which is less than the first threshold.

51. The method as defined in claim 49, wherein said sensed signal is generated by a rate sensor.

52. The method as defined in claim 51, wherein said rate sensor comprises an angular rate sensor.

* * * * *